United States Patent
Sato et al.

(10) Patent No.: US 7,452,022 B2
(45) Date of Patent: Nov. 18, 2008

(54) FRONT PORTION STRUCTURE FOR VEHICLE

(75) Inventors: Katsuhiko Sato, Hino (JP); Tatsuo Miyamoto, Hino (JP); Shoichi Sakai, Hino (JP); Katsuhiro Watanabe, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 0 days.

(21) Appl. No.: 11/608,416

(22) Filed: Dec. 8, 2006

(65) Prior Publication Data

US 2007/0145782 A1 Jun. 28, 2007

(30) Foreign Application Priority Data

Dec. 22, 2005 (JP) ............................. 2005-370389

(51) Int. Cl.
*B60J 10/02* (2006.01)

(52) U.S. Cl. ....................................................... 296/93

(58) Field of Classification Search .................. 296/93, 296/187.01, 201, 29, 146.1, 146.15, 84.1, 296/96.21

See application file for complete search history.

(56) References Cited

U.S. PATENT DOCUMENTS

| | | | |
|---|---|---|---|
| 5,803,527 A * | 9/1998 | Fujiya | 296/93 |
| 7,073,842 B2 * | 7/2006 | Kagawa | 296/146.15 |
| 2004/0212216 A1 * | 10/2004 | Kagawa | 296/146.15 |
| 2006/0125275 A1 * | 6/2006 | Wato et al. | 296/93 |

* cited by examiner

*Primary Examiner*—H Gutman
(74) *Attorney, Agent, or Firm*—Oblon, Spivak, McClelland, Maier & Neustadt, P.C.

(57) ABSTRACT

A bent front wall 2a of a roof panel 2 is not bent at least inwardly of a press-worked direction of the roof panel 2, so that a front end of the roof panel 2 is free from undercut formation. This eliminates the necessity to further machine the front wall 2a of the press-worked roof panel 2, using for example a cam. Thus, manufacturing cost may be reduced without increasing man-hour.

16 Claims, 3 Drawing Sheets

FRONT PORTION STRUCTURE FOR VEHICLE

BACKGROUND OF THE INVENTION

1. Field of the Invention

The present invention relates to a front portion structure for a vehicle.

2. Description of the Related Art

As shown in FIG. 1, a front portion of a vehicle in general has a windshield glass 1 which secures a field of vision for a driver and serves as partition of a driver's cabin to outside. As shown in FIG. 2, an upper end of the windshield glass 1 is attached to a roof panel 2 by adhesive 3. More specifically, the roof panel 2 conventionally has a front end constituted by an inwardly bent front wall 2a and a joining extension 2b extending forward from a lower portion of the front wall 2a. The upper end of the windshield glass 1 is attached to the extension 2b of the roof panel 2 by the adhesive 3, an upper edge of the glass 1 being covered with a windshield molding 4.

Interposed between the extension 2b and the upper end of the windshield glass 1 is a dam or weir 5 for prevention of the adhesive 3 from leaking toward inside of the glass 1. A front portion of the roof panel 2 is inwardly reinforced by a reinforcement 6 with a box-shaped section. An inward surface of the reinforcement 6 adjacent to the cabin is covered with an interior roof member 7.

A front portion structure for a vehicle as shown in FIG. 2 has been disclosed for example in JP 07-215241A.

In the above-mentioned conventional structure, generally as shown in FIG. 2, the front wall 2a of the roof panel 2 is bent inwardly of vertical or press-worked direction, along which the roof panel 2 has been press-worked, into a so-called undercut. This undercut formation is attained by firstly press-working the roof panel 2 and further machining the press-worked front wall 2a of the panel 2, using for example a cam, which disadvantageously results in increase of man-hour and of manufacturing cost.

The invention was made in view of the above and has its object to provide a front portion structure for a vehicle which enables formation of a press-worked roof panel without excessive process steps to reduce manufacturing cost.

SUMMARY OF THE INVENTION

The invention is directed to a front portion structure for a vehicle comprising a roof panel with a front end constituted by an inwardly bent front wall and a joining extension extending forward from a lower portion of said bent front wall, and a windshield glass with an upper end attached to said joining extension, an upper edge of the glass being covered with a windshield molding, the front wall of the roof panel being not bent at least inwardly of a press-worked direction of the roof panel.

An end of the windshield molding adjacent to the roof panel may be positioned backward of the joining extension of the roof panel.

A flat mounting for fixture of the windshield mounting may be provided between the front wall and joint extension of the roof panel.

Next, an embodiment of the invention will be described in conjunction with the attached drawings.

DETAILED DESCRIPTION OF THE PREFERRED EMBODIMENT

Figure 1:
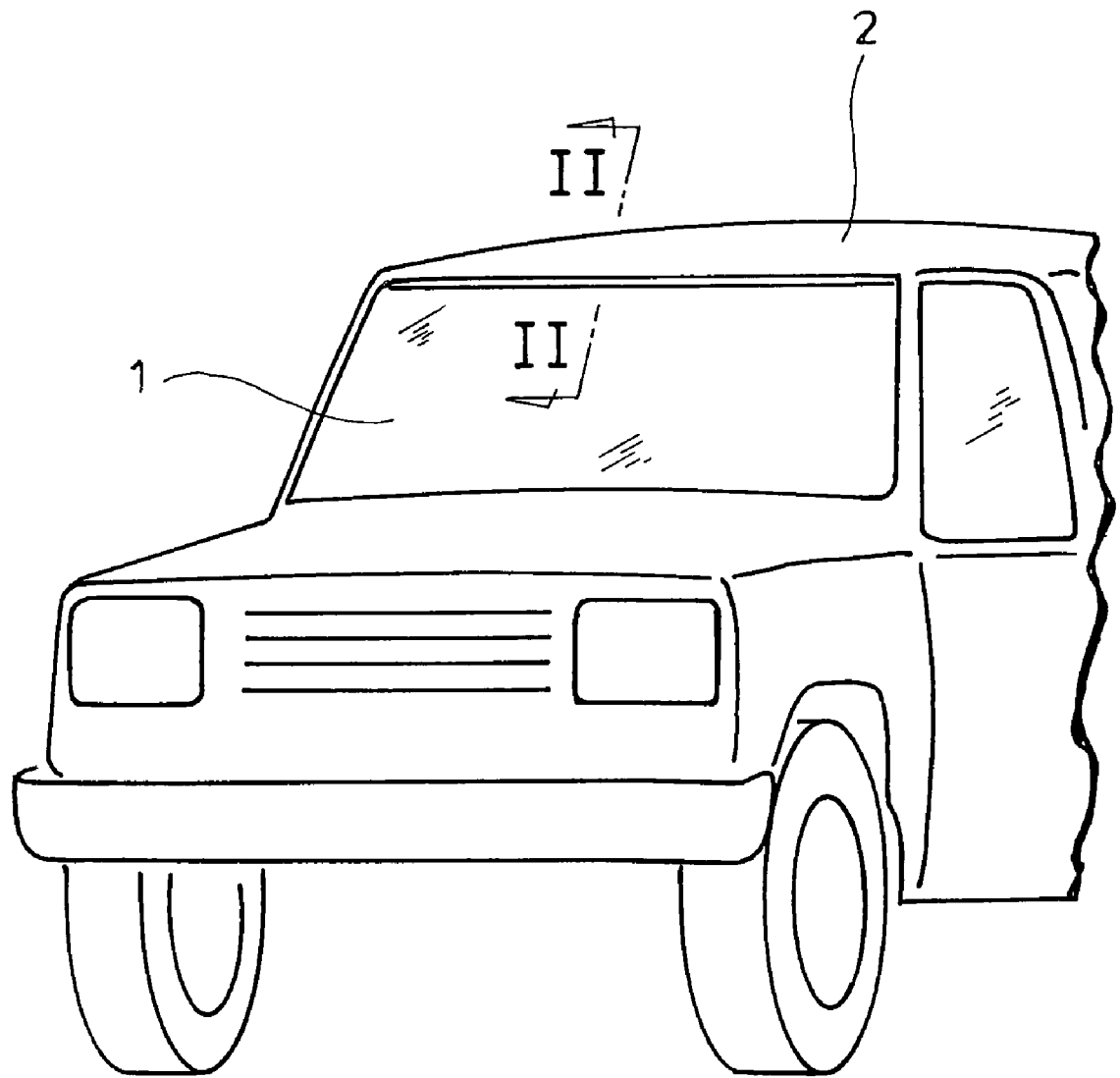
FIG. 1 is a perspective view showing an example of a vehicle.
Figure 2:
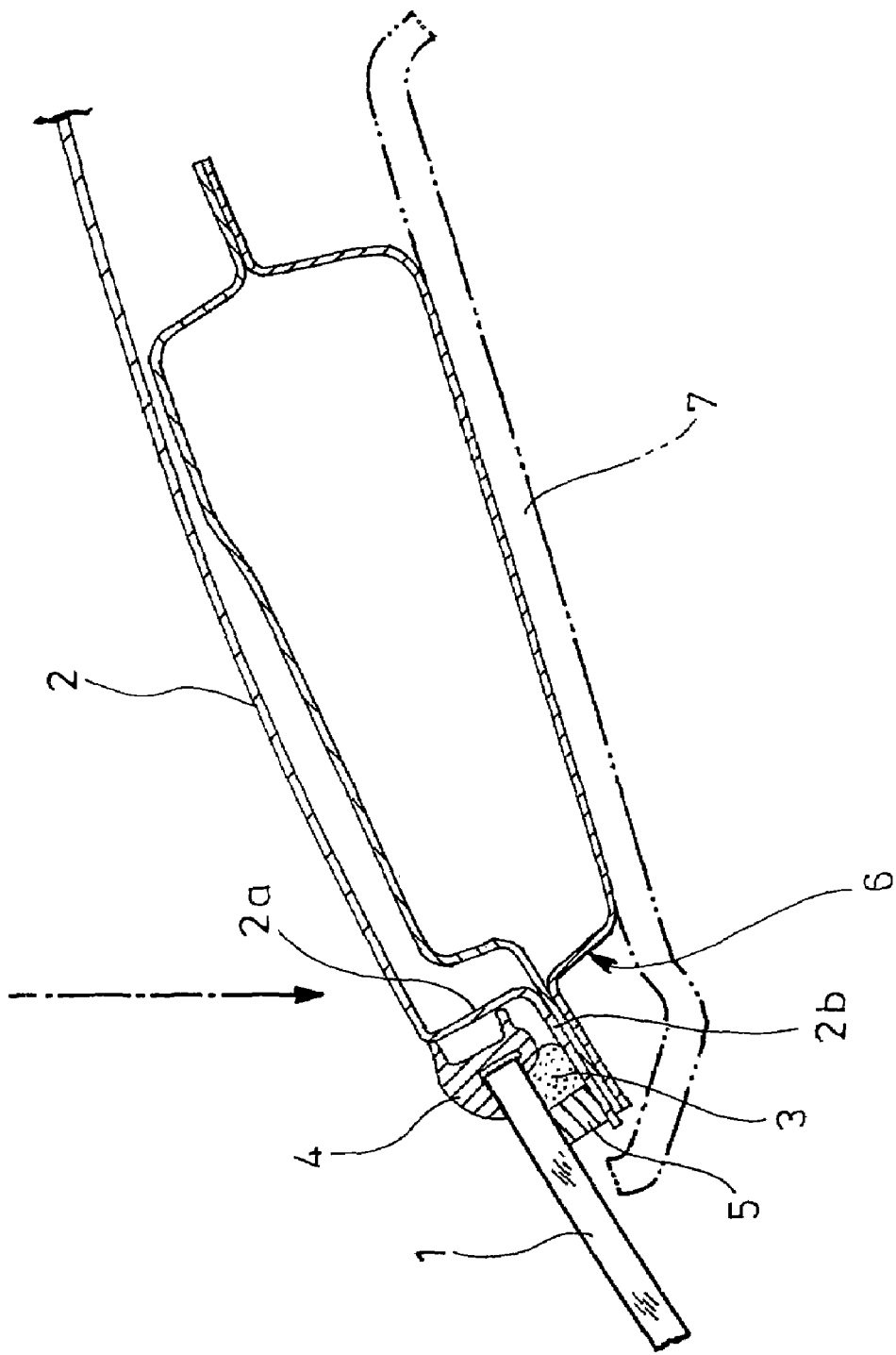
FIG. 2 is a sectional side elevation taken along arrows II in FIG. 1 to show a conventional structure.
Figure 3:
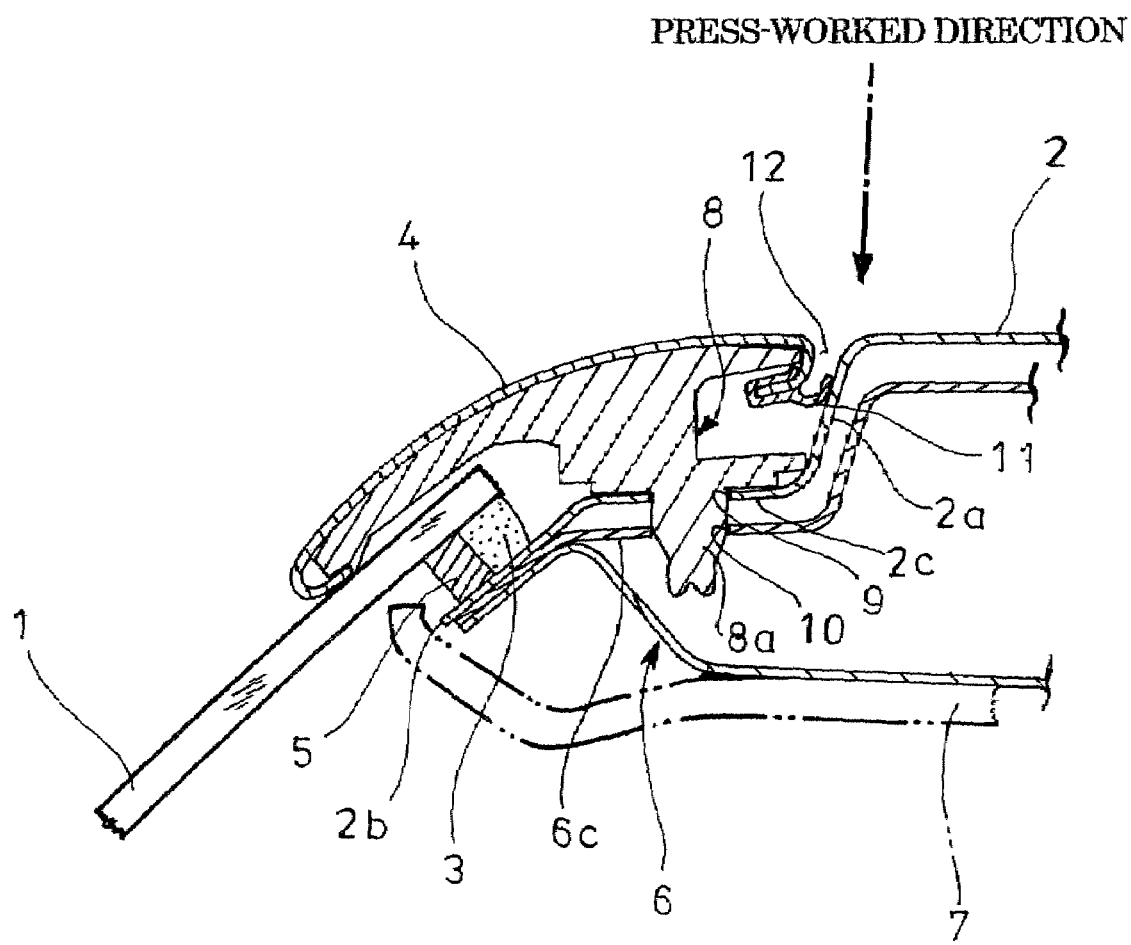
FIG. 3 is a sectional side elevation showing an embodiment of the invention.

FIG. 3 shows the embodiment of the invention in which parts similar to those in FIGS. 1 and 2 are represented by the same reference numerals. The roof panel 2 is constructed such that the front wall 2a is not bent at least inwardly of a press-worked direction of the roof panel 2. In other words, as shown in FIG. 3, the front wall 2a extends at an obtuse angle with respect to the panel 2. parts similar to those in FIGS. 1 and 2 are represented by the same reference numerals. The roof panel 2 is constructed such that the front wall 2a is not bent at least inwardly of a press-worked direction of the roof panel 2.

In the embodiment, employed is a larger-sized windshield molding 4 with its end adjacent to the roof panel 2 being positioned backward of the joining extension 2b of the roof panel 2, a flat mounting 2c being provided between the front wall 2a and joining extension 2b of the roof panel 2 so as to fix the windshield molding 4.

As shown in FIG. 3, the windshield molding 4 comprises a thin strip member extending laterally of a vehicle (or in a direction perpendicular to the plane of FIG. 3) with a moderately curved section and with opposite ends respectively inwardly folded into U-shape. The windshield molding 4 is inwardly fitted with a retainer 8 for lateral arrangement of the molding 4 in position.

The flat mounting 2c of the roof panel 2 is substantially in parallel with a rear top portion of the curved molding 4 and is formed with openings 9 spaced part from one another laterally of the vehicle and in which clip pieces 8a of the retainer 8 may be fitted. For consistency with the flat mounting 2c between the front wall 2a and joining extension 2b of the roof panel 2, the reinforcement 6 has a corresponding flat surface 6c with corresponding openings 10 for fitting of the clip pieces 8a.

Thus, the windshield molding 4 lined with the retainer 8 is fixed to the front end of the roof panel 2 reinforced by the reinforcement 6 by fitting the clip pieces 8a of the retainer 8 into the openings 9 and 10.

A gap is formed between the U-shaped fold of the rear upper end of the windshield molding 4 and the front wall 2a of the roof panel 2; and the former is sealed by a weather-strip 11 which is fitted at its tip end to the latter to thereby provide a rain gutter 12 which receives and guides rain drops from the roof panel 2 to lateral ends of the vehicle.

Next, the mode of operation of the embodiment will be described.

As mentioned above, the front wall 2a of the roof panel 2 is not bent at least inwardly of the press-worked direction of the roof panel 2, which eliminates an undercut portion of the front end of the roof panel 2. In the FIG. 3 example, the front wall 2a extends at an obtuse angle with respect to the roof panel 2. As a result, it is not necessary to further machine the press-worked front wall 2a of the roof panel 2, using for example a cam. Thus, the manufacturing cost may be reduced without increasing laborer man-hours.

According to the embodiment, an end of the windshield molding 4 adjacent to the roof panel 2 is positioned backward of the joining extension 2b of the roof panel 2, so that a border between the windshield molding 4 and roof panel 2 is shifted backward in comparison with the conventional structures, which suppresses wind noise, improves outlook of the vehicle and enables the rain drops from the roof panel 2 to be hard to reach a surface of the windshield glass 1.

Moreover, the rain gutter 12 is provided by providing the gap between and the U-shaped fold of the rear upper end of the windshield molding 4 and the front wall 2a of the roof panel 2a and by sealing said U-shaped fold by the weatherstrip 11 which is fitted at its tip end to the front wall 2a, so that the rain drops from the roof panel 2 are gathered in the gutter 12 and guided to the lateral ends of the vehicle, which fact further enhances the tendency of the rain drops from the roof panel 2 hard to reach the surface of the windshield glass 1.

According to the embodiment, the flat mounting 2c is provided between the front wall 2a and joining extension 2b of the roof panel 2 so as to fix the windshield molding 4, so that even if the windshield molding 4 is large-sized, it can be reliably retained.

Furthermore, because of the flat mounting 2c being provided, the front end of the roof panel 2 has two bends, i.e., the bend between the front wall 2a and flat mounting 2c and between the flat mounting 2c and the joining extension 2b, which contribute to increased stiffness of the roof panel 2.

Because of flat mounting 2c arranged substantially in parallel with the rear upper portion of the curved windshield molding 4, any more or less misalignment in position of the openings 9 on the flat mounting 2c may result in not excessive misalignment but coplanarity between the rear upper surface of the windshield molding 4 and the upper surface of the roof panel 2. Thus, adverse effect on the appearance of the vehicle can be effectively averted.

Thus, the pressed-worked roof panel 2 can be formed without excessive process steps to reduce the manufacturing cost.

The wind noise can be suppressed and outlook of the vehicle can be improved while rain drops from the roof panel 2 to the surface of the windshield glass 1 can be relieved.

Furthermore, any large-sized windshield molding 4 can be coped with.

It is to be understood that a front portion structure for vehicle according to the invention is not limited to the abovementioned embodiment and that various changes and modifications may be made without leaving the spirit of the invention.

What is claimed is:

1. A front portion structure for a vehicle comprising:
   a roof panel with a front end comprising an inwardly bent front wall and a joining extension extending forward from a lower portion of said bent front wall;
   a windshield glass with an upper end attached to said joining extension;
   a windshield molding which covers an upper edge of the windshield glass;
   wherein the front wall extends at an obtuse angle with respect to the roof panel;
   wherein one end of the windshield molding adjacent to the roof panel is positioned backward of the joining extension of the roof panel;
   wherein a flat mounting is provided between the front wall and the joining extension of the roof panel and wherein the windshield molding is fixed to the flat mounting; and
   wherein the windshield molding includes a retainer and wherein a portion of the retainer extends through an opening in the flat mounting.

2. A front portion structure as recited in claim 1, further including a reinforcement having an opening, and wherein said portion of said retainer also extends through the opening of said reinforcement.

3. A front portion structure as recited in claim 2, wherein said reinforcement includes a flat surface, and wherein the opening of said reinforcement extends through the flat surface.

4. A front portion as recited in claim 1, wherein said windshield molding is in contact with said flat mounting.

5. A front portion structure for a vehicle comprising:
   a roof panel with a front end comprising an inwardly bent front wall and a joining extension extending forward from a lower portion of said bent front wall;
   a windshield glass with an upper end attached to said joining extension;
   a windshield molding which covers an upper edge of the windshield glass;
   wherein the front wall extends at an obtuse angle with respect to the roof panel;
   wherein one end of the windshield molding adjacent to the roof panel is positioned backward of the joining extension of the roof panel;
   wherein a flat mounting is provided between the front wall and the joining extension of the roof panel and wherein the windshield molding is fixed to the flat mounting; and
   wherein a gap is provided between a top backward end of the window molding and the front wall of the roof panel, and wherein the gap provides a gutter to guide water flow.

6. A front portion structure as recited in claim 5, further including a weather strip in said gap.

7. A front portion structure for a vehicle comprising:
   a roof panel with a front end comprising an inwardly bent front wall and a joining extension extending forward from a lower portion of said bent front wall;
   a windshield glass with an upper end attached to said joining extension;
   a windshield molding which covers an upper edge of the windshield glass;
   wherein the front wall extends at an obtuse angle with respect to the roof panel;
   wherein one end of the windshield molding adjacent to the roof panel is positioned backward of the joining extension of the roof panel;
   wherein a flat mounting is provided between the front wall and the joining extension of the roof panel and wherein the windshield molding is fixed to the flat mounting;
   wherein said windshield molding is in contact with said flat mounting; and
   wherein said windshield molding includes a retainer which lines said molding, and wherein said retainer extends through an opening in part of said roof panel.

8. A front portion as recited in claim 7, wherein said opening is provided in said flat mounting.

9. A front portion structure for a vehicle comprising:
   a roof panel with a front end comprising an inwardly bent front wall and a joining extension extending forward from a lower portion of said bent front wall;
   a windshield glass with an upper end attached to said joining extension;
   a windshield molding which covers an upper edge of the windshield glass;
   wherein one end of the windshield molding adjacent to the roof panel is positioned backward of the joining extension of the roof panel;
   wherein a flat mounting is provided between the front wall and the joining extension of the roof panel and wherein the windshield molding is fixed to the flat mounting; and wherein the windshield molding includes a retainer and wherein a portion of the retainer extends through an opening in the flat mounting.

10. A front portion structure as recited in claim 9, further including a reinforcement having an opening, and wherein said portion of said retainer also extends through the opening of said reinforcement.

11. A front portion structure as recited in claim 10, wherein said reinforcement includes a flat surface, and wherein the opening of said reinforcement extends through the flat surface.

12. A front portion as recited in claim 9, wherein said windshield molding is in contact with said flat mounting.

13. A front portion structure for a vehicle comprising:
a roof panel with a front end comprising an inwardly bent front wall and a joining extension extending forward from a lower portion of said bent front wall;
a windshield glass with an upper end attached to said joining extension;
a windshield molding which covers an upper edge of the windshield glass;
wherein one end of the windshield molding adjacent to the roof panel is positioned backward of the joining extension of the roof panel;
wherein a flat mounting is provided between the front wall and the joining extension of the roof panel and wherein the windshield molding is fixed to the flat mounting; and
wherein a gap is provided between a top backward end of the window molding and the front wall of the roof panel, and wherein the gap provides a gutter to guide water flow.

14. A front portion structure as recited in claim 13, further including a weather strip in said gap.

15. A front portion structure for a vehicle comprising:
a roof panel with a front end comprising an inwardly bent front wall and a joining extension extending forward from a lower portion of said bent front wall;
a windshield glass with an upper end attached to said joining extension;
a windshield molding which covers an upper edge of the windshield glass;
wherein one end of the windshield molding adjacent to the roof panel is positioned backward of the joining extension of the roof panel;
wherein a flat mounting is provided between the front wall and the joining extension of the roof panel and wherein the windshield molding is fixed to the flat mounting;
wherein said windshield molding is in contact with said flat mounting; and
wherein said windshield molding includes a retainer which lines said molding, and wherein said retainer extends through an opening in part of said roof panel.

16. A front portion as recited in claim 15, wherein said opening is provided in said flat mounting.

* * * * *